Aug. 19, 1941.   W. W. SWEARINGER   2,253,449
CULTIVATOR STAFF
Filed Aug. 17, 1939   2 Sheets-Sheet 1

Inventor
Walter W. Swearinger
By L. F. Randolph
Attorney

Aug. 19, 1941.  W. W. SWEARINGER  2,253,449
CULTIVATOR STAFF
Filed Aug. 17, 1939  2 Sheets—Sheet 2
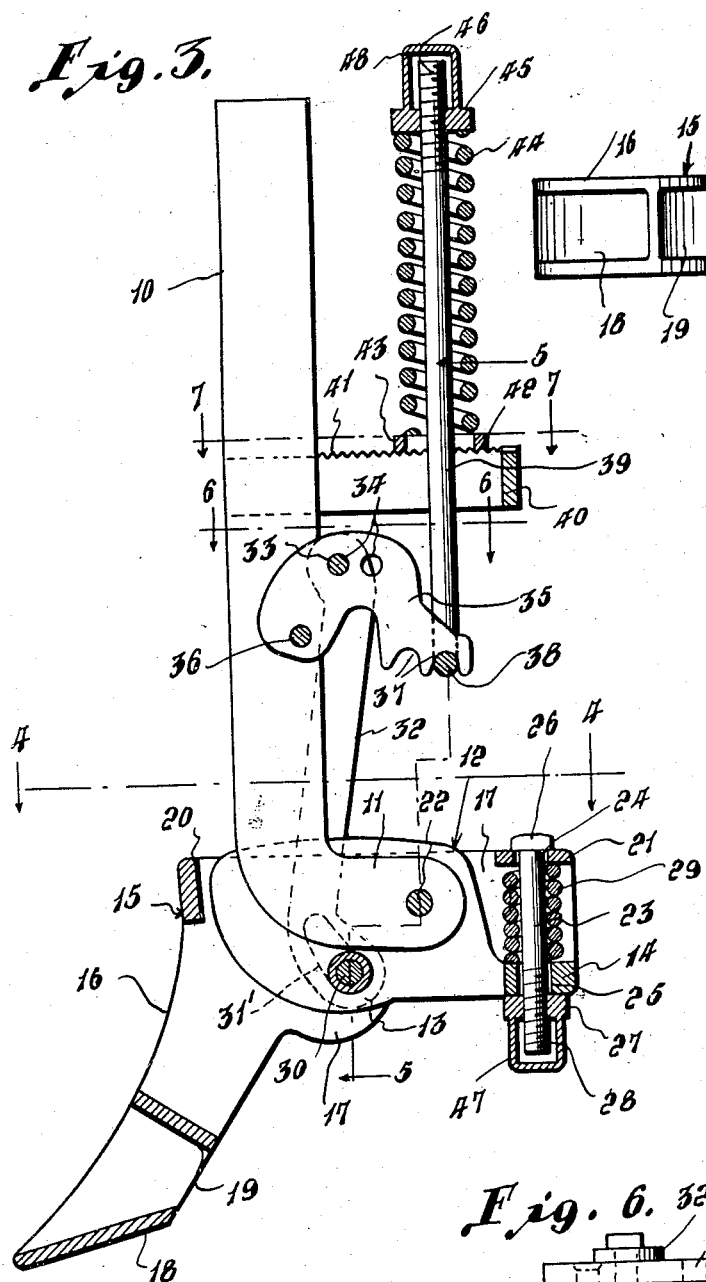
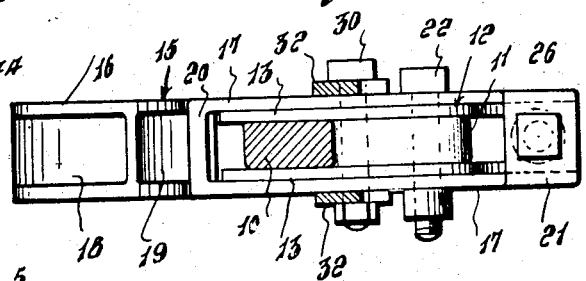
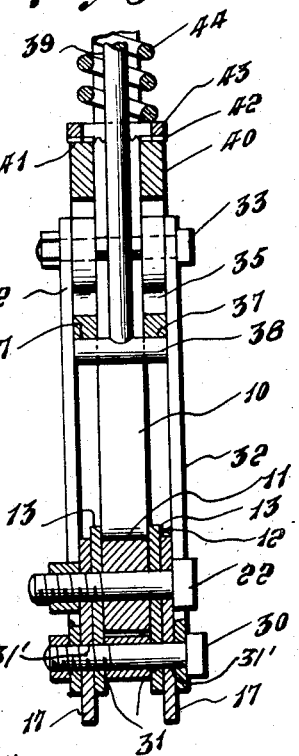
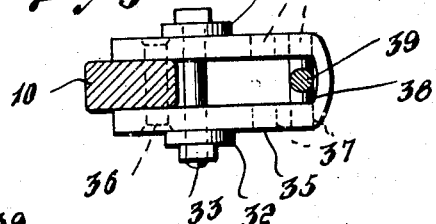
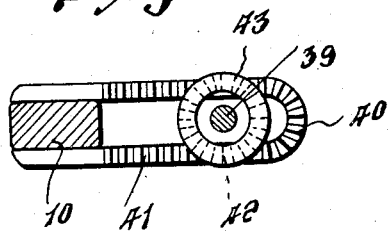
Inventor
Walter W. Swearinger
By L. F. Randolph
Attorney Patented Aug. 19, 1941

2,253,449

UNITED STATES PATENT OFFICE 2,253,449

CULTIVATOR STAFF

Walter W. Swearinger, Newport, Ark.

Application August 17, 1939, Serial No. 290,665

3 Claims. (Cl. 97—184)

This invention relates to a cultivator staff and particularly to means for adjustably and resiliently mounting the sweep, shovel or plow of a cultivator or the equivalent, so that the cultivator or sweep may be disposed at the desired angle and will not break when encountering undue obstructions.

The more specific objects and advantages will become apparent from a consideration of the description following taken in connection with accompanying drawings illustrating an operative embodiment.

In said drawings—

Figure 3 is a substantially central vertical sectional view through my improvements;

Figure 4 is a horizontal section taken on the line 4—4 of Figure 3;

Figure 5 is a vertical section taken on the line 5—5 of Figure 3;

Figure 6 is a horizontal section taken on the line 6—6 of Figure 3, and

Figure 7 is a detail section taken on the line 7—7 of Figure 3.

Figure 1:
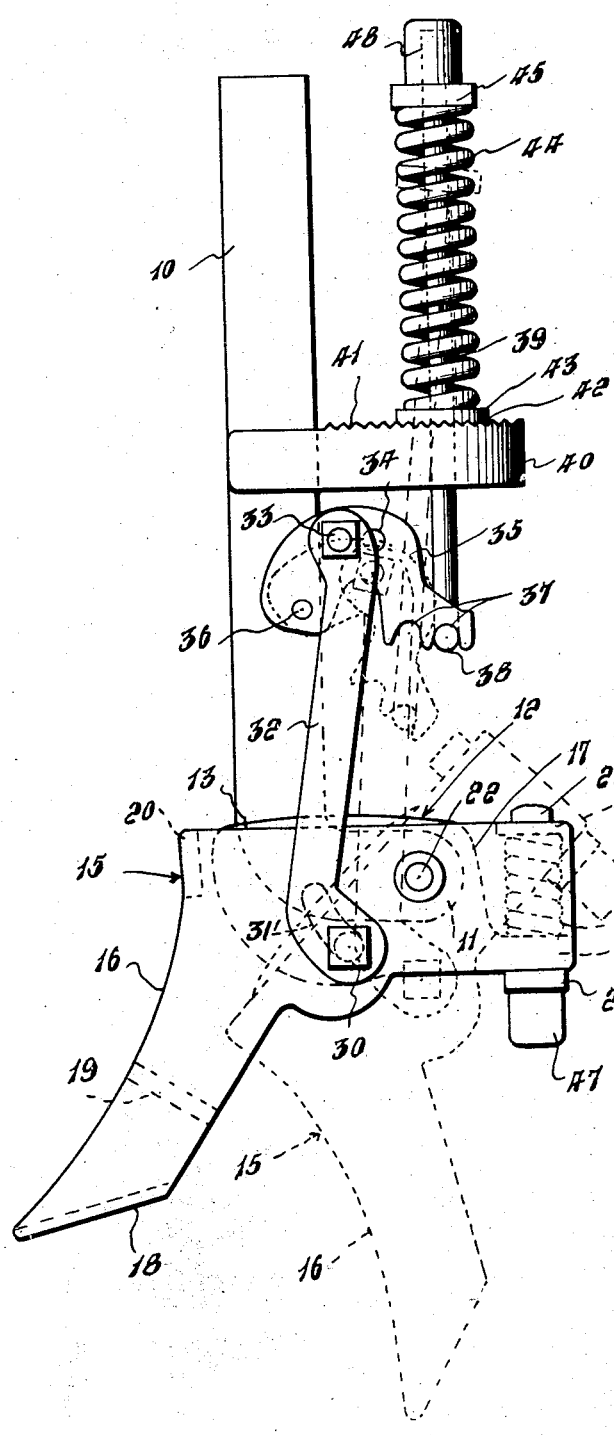
Figure 1 is a view in side elevation showing my improvements.
Figure 2:
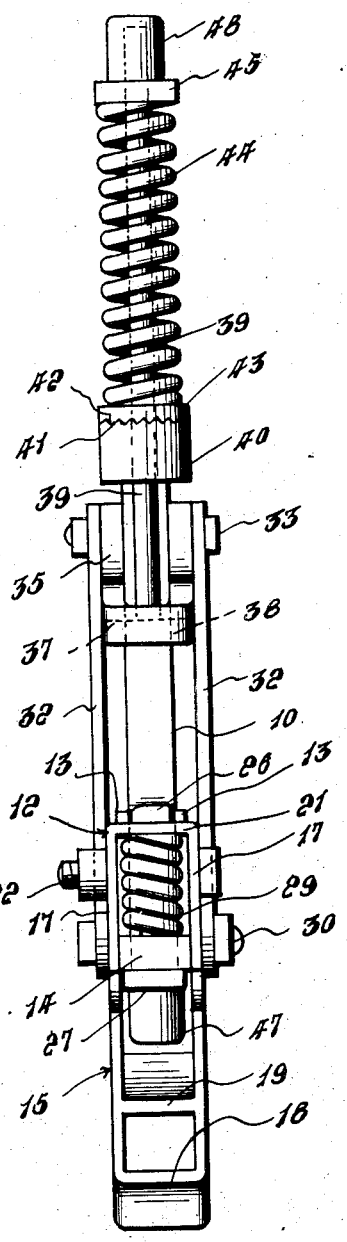
Figure 2 is a view in elevation of the improvements taken at a right angle to Figure 1.

Referring specifically to the drawings wherein like reference characters designate like or similar parts, 10 designates a conventional support, beam or the like such as depends from a cultivator or the equivalent, whether horse drawn or power driven. At the lower end, support or beam 10 has a rearwardly extending arm 11. Arm 11 extends into a saddle 12 which consists primarily of parallel plates 13 integrally connected by a bridge at the rear lower portion 14.

Said saddle 12 is disposed within a foot or shank 15, to the front curved surface 16 of which, a sweep, plow, shovel, cultivator or the equivalent is adapted to be removably bolted or otherwise fastened. This shank or foot essentially has spaced apart plates 17 which are parallel with each other and which are integrally connected by webs as at 18, 19, 20 and 21, respectively. A bolt 22 is removably passed through the plates 17, 13 and arm 11, thus pivotally connecting the parts through which it passes, for adjustment and yielding.

The foot or shank 15 is adapted to be adjustably connected to the saddle 12 at different angles, according to the position or angle desired for the shovel, sweep or the like attached to the foot or shank 15. To this end, a bolt 23 is passed removably through enlarged openings 24 and 25, respectively, in the web 21 and bridge 14. Bolt 23 has a head 26 resting on the web 21 and beneath the bridge 14, a nut 27 engages screw threads 28 on the bolt. An expansive coil spring 29 surrounds the bolt 23 and at opposite ends engages the bridge 14 and web 21, respectively, thus urging the shank into and maintaining it in the adjusted position permitted by the position of the nut 27.

A bolt 30 passes removably through openings 31 and 31' in the plates 13 and 17, respectively. The openings 31' are enlarged with respect to the bolt as shown, to permit the relative adjustments between the foot or shank 15 and the saddle 12.

Said bolt 30 also passes through openings in the lower end of links 32 which extend upwardly and are pivotally connected to a removable bolt 33 passed selectively through openings 34 in a lever or yoke 35, preferably U-shaped in plan, as shown, with its terminals pivotally connected as by means of a bolt 36 to the support or beam 10. The series of openings 34 enable the bolt 33 to be placed in different positions, according to the adjustment desired for the links 32.

The lower edge of the yoke or lever 35 has a plurality of notches 37 therein selectively engageable by a cross member 38 of a bolt 39, extending upwardly through the yoke and through a U-shaped saddle or projection 40 welded or otherwise connected to the support or beam 10.

The upper surface of said projection 40 is serrated as at 41 and is engaged by the under serrated surface 42 of a washer 43, the serrations enabling the latter to be placed and held in different adjusted positions along the projection. A coil spring 44 surrounds the bolt 39 and rests on the washer 43 and its upper end is engaged by a nut 45, engaging screw threads 46 on the bolt 39.

Both of the nuts 27 and 45, are preferably provided with cups or housings as at 47 and 48, respectively, so that they may contain grease or lubricant which will flow onto the screw threads and adjacent parts, preventing rusting thereof and facilitating adjustments at all times.

The parts are shown in the drawings in normal position in full lines. The nut 27 may be adjusted as desired, to vary the angle or position of the foot or shank 15 with respect to the saddle 12 to accordingly vary the position of the plow, sweep, shovel or the like. As the device advances, and the plow, sweep or shovel encounters an undue obstruction, the foot or shank 15 will move backwardly, swinging on the pivot 22 and swinging with it as a unit, the saddle 12, also moving the links 32 downwardly and rearwardly and pulling the lever or yoke 35 downwardly on the pivot 36, correspondingly lowering the bolt 39 so as to compress the spring 44, moving for instance to the dotted line position shown in Figure 1. When the obstruction is passed, spring 44 will expand to restore the parts to the normal or full line position shown.

Various changes may be resorted to provided they fall within the spirit and scope of the invention.

I claim as my invention:

1. A device of the class described comprising a support, a shank, a saddle, means pivoting said shank and saddle together and to the support, means to adjust the shank and saddle relatively to each other, expansive means to resist swinging of the shank and saddle, said means passing through slots in the shank and saddle, one of the slots being enlarged with respect to said means to permit the relative movement of the shank and saddle.

2. A device of the class described comprising a support, a shank, a saddle, means pivoting said shank and saddle together and to the support, means to adjust the shank and saddle relatively to each other, expansive means to resist swinging of the shank and saddle, said means passing through slots in the shank and saddle, one of the slots being enlarged with respect to said means to permit the relative movement of the shank and saddle, said second mentioned means comprising a bolt, a web on the shank and a bridge on the saddle through which the bolt passes, a head and a nut on said bolt respectively engaging said web or bridge, and an expansive spring between the web and bridge engaging them and surrounding the bolt.

3. A device of the class described comprising a support, a shovel-carrying shank pivoted on said support, a link pivoted to the shank, a lever pivoted to the support and to the link, a spring, means co-acting with the spring and lever to tension the spring through operation of the lever, said lever being of U-shape with its terminals receiving the support therebetween, the last mentioned means comprising a bolt extending through said lever and having a cross member, said lever having a notch in its undersurface engaged by the cross member, a projection above which said bolt extends, the upper surface of said projection being serrated, a washer having a serrated surface engaging the first mentioned serrations, said spring being seated on the washer, and a nut on the bolt engaging the opposite end of the spring to the washer.

WALTER W. SWEARINGER.